United States Patent
Denaro

[11] Patent Number: 5,981,937
[45] Date of Patent: Nov. 9, 1999

[54] OPTICAL SYSTEM FOR OBSERVING ROTATING OBJECTS

[76] Inventor: James Denaro, 543 Bedford St., Concord, Mass. 01742

[21] Appl. No.: 08/950,095

[22] Filed: Oct. 14, 1997

[51] Int. Cl.[6] .................................. G01B 9/04; G06K 9/32
[52] U.S. Cl. .............. 250/216; 250/559.08; 250/559.14; 348/80
[58] Field of Search ...................... 250/234, 235, 250/236, 216, 559.07, 559.08, 559.14, 208.1; 356/372, 373, 375, 399, 400, 401; 348/94, 95, 79, 80

[56] References Cited

U.S. PATENT DOCUMENTS

| | | | |
|---|---|---|---|
| 3,449,035 | 6/1969 | Denaro . | |
| 4,376,582 | 3/1983 | Kirchner et al. | 356/71 |
| 4,537,509 | 8/1985 | Kronfeld | 356/399 |
| 4,593,406 | 6/1986 | Stone | 382/44 |
| 4,637,718 | 1/1987 | Kirchner et al. | 356/71 |
| 4,717,823 | 1/1988 | Steimel et al. | 250/236 |
| 5,357,341 | 10/1994 | Küchel et al. | 356/353 |
| 5,416,574 | 5/1995 | Fantone | 356/124 |

*Primary Examiner*—John R. Lee
*Attorney, Agent, or Firm*—John E. Toupal; Harold G. Jarcho

[57] ABSTRACT

An optical system including a stage for supporting a material to be observed and mounted for rotation on a given axis, a Dove prism mounted for rotation on the given axis and having an optical axis aligned therewith, a drive mechanism, a prism coupling mechanism coupled between the drive mechanism and the prism, and a stage coupling mechanism coupled between the drive mechanism and the stage. The prism coupling mechanism rotates the prism on the given axis and the stage coupling mechanism rotates the stage on the given axis.

15 Claims, 1 Drawing Sheet

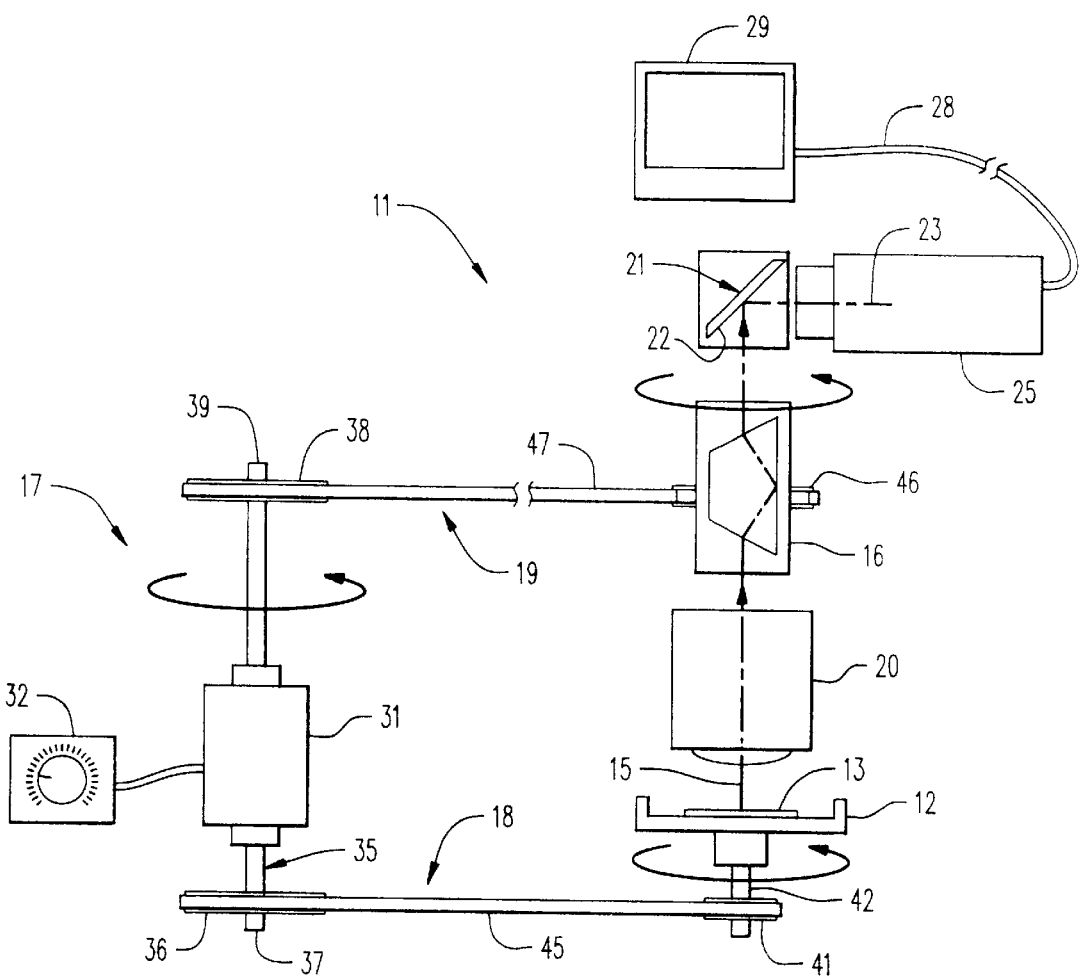
FIG.

OPTICAL SYSTEM FOR OBSERVING ROTATING OBJECTS

BACKGROUND OF THE INVENTION

This invention relates generally to an optical system and, more particularly, to an optical system for providing stationary images of rotating objects.

Heretofore, stroboscope type devices have been employed to measure rotational speed of a body. A typical stroboscope includes a pulsing light source which provides pulses of light at a controlled rate. These pulses of light illuminate the rotating body which preferably is shrouded by darkness except for the light from the pulsating source. When the rate of the light pulses is equal to the rotational speed of the body, the body appears to the observer to be stationary. However, due to the intermittent nature of the stroboscope light and the quality of the light, detail inspection of the rotating body by the observer is most difficult and, at best, the observer can merely ascertain that the pulse rate is the same as the rotational speed of the body and thereby determine the rotational speed of the body. It is most difficult for the observer to inspect in detail various parts, components or occurrences in the body during rotation by employing such a stroboscope device. For example, it is difficult for an observer to employ a stroboscope to observe a centrifuge in action so as to inspect the processes of separation, precipitation or other phenomenon which occurs during centrifuge. Inspection is difficult because of the intermittent nature of the stroboscope light and the quality of the light. Furthermore, illumination is limited to light that can presently be obtained within the state of the art with stroboscope devices. This does not include all of the visible spectrum, infrared, microwave and other bands of radiation.

U.S. Pat. No. 3,449,035 discloses an optical system which provides an observer with stationary images of rotating objects. The optical system disclosed in the patent alleviates many of the above described disadvantages inherent in stroboscope devices. However, the system exhibits other deficiencies such as cumbersome optical and mechanical arrangements, intricate production and assembly requirements and less than satisfactory image reproduction.

The object of this invention, therefore, is to provide an improved optical system for producing stationary images of rotating objects.

SUMMARY OF THE INVENTION

The invention is an optical system including a stage for supporting a material to be observed and mounted for rotation on a given axis, a Dove prism mounted for rotation on the given axis and having an optical axis aligned therewith, a drive mechanism, a prism coupling mechanism coupled between the drive mechanism and the prism, and a stage coupling mechanism coupled between the drive mechanism and the stage. The prism coupling mechanism rotates the prism on the given axis and the stage coupling mechanism rotates the stage on the given axis. The use of a Dove prism and common drive for the stage and prism simplifies the optical structure.

According to one feature of the system, a microscope is disposed between the stage and the prism and has an optical axis aligned with the given axis. The microscope improves the quality of the optical image produced.

According to another feature of the system, a mirror having a reflective face is aligned with the given axis and the prism is disposed between the stage and the mirror. The mirror provides an upright reflected image of the rotating material.

According to yet other features of the system, a video camera is arranged to receive optical images reflected from the mirror and a television monitor is connected to receive an output of the video camera. The camera and television monitor facilitate productive use of the system.

According to still other features of the system, the prism and stage coupling mechanisms are arranged to provide a common direction of rotation for, respectively, the prism and the stage; and a rotational speed w, for the prism and a rotational speed 2 w for the stage. These features insure the provision of a stationary image of the rotating material.

According to additional features of the system, the drive mechanism includes a variable speed motor; the stage coupling mechanism includes a first drive pulley rotated by the motor, a first driven pulley fixed for rotation with the stage and a first drive belt rotationally coupling the first drive pulley and the first driven pulley, and the prism coupling mechanism includes a second drive pulley rotated by the motor, a second driven pulley fixed for rotation with the prism and a second drive belt rotationally coupling the second drive pulley and the second driven pulley. These drive and coupling mechanisms efficiently produce the desired stationary optical image of the rotating material.

DESCRIPTION OF THE DRAWING

These and other objects and features of the invention will become more apparent upon a perusal of the following description taken in conjunction with the accompanying drawing wherein the FIGURE illustrates an optical system for use in observing rotating objects.

DESCRIPTION OF THE PREFERRED EMBODIMENT

Illustrated in the FIGURE is an optical system 11 for observing rotating objects. A stage 12 is mounted for rotation on a given rotational axis 15. The stage 12 provides a support surface for a sample object 13 to be observed while subjected to centrifugal forces. Also mounted for rotation on the given axis 15 and having an optical axis aligned therewith is a Dove prism 16. The Dove prism 16 is a conventional optical device (Edmund Scientific, stock number A43,673) which, when rotated, rotates a transmitted image at a speed twice that of the prism 16. Operatively coupling the rotatable stage 12 and the rotatable prism 16 to a drive assembly 17 are, respectively, a stage coupling assembly 18 and a prism coupling assembly 19. A microscope 20 having an optical axis aligned with the given rotational axis 15 is disposed between the stage 12 and the prism 16.

Arranged to receive the optical output of the prism 16 is a mirror 21 having a reflective surface 22 oriented at an angle of 45 degrees to the given axis 15 so as to produce a reflected optical output 23 orthogonal thereto. A video camera 25 is arranged to receive and record the optical output 23 received from the reflective surface 22 of the mirror 21. Connected to receive an output of the video camera 25 via a cable 28 is a television monitor 29.

The drive assembly 17 includes a variable speed, electrical motor 31 controlled by a manually operated controller 32. Projecting from opposite ends of the motor 31 is a drive shaft 35. A first drive pulley 36 is rotatably fixed to one end 37 of the drive shaft 35 while a second drive pulley 38 is rotatably fixed to an opposite end 39 of the drive shaft 35. The coupling mechanisms 18, 19 include, respectively, a first driven pulley 41 rotatably fixed to a shaft 42 supporting the stage 12 for rotation on the axis 15 and a second driven pulley 46 rotatably fixed to the prism 16. Also included in the stage coupling mechanism and rotationally coupling the first drive pulley 36 and the first driven pulley 41 is a first drive belt 45. Similarly, the prism coupling mechanism 19 includes a second drive belt 47 rotationally coupling the second drive pulley 38 to the second driven pulley 46. The first and second drive belts 45, 47 preferably are arranged to provide a common direction of rotation for the stage 12 and the prism 16. In addition, the diameters of the first and second drive and driven pulleys 37, 39 and 41, 46 preferably are dimensioned so as to provide a selected rotational speed w for the prism 16 and a rotational speed 2 w for the stage 12.

During use of the optical system 11, a material 13 to be observed under centrifugal force is positioned on the stage 12 in alignment with the given axis 15. The material 13 can include, for example, a microscope slide specimen; a three-dimensional object for which material stress is to be observed; a vial of liquid of blood to be subjected to flow or separation; or liquid, gas or particulates for which filtering phenomenon is to be observed. In addition, the optical system 11 can be used to design and test mechanical switching devices and the like. The controller 32 then is used to actuate the drive motor 31 at a speed that produces a predetermined rotational speed 2 w for the stage 12. In response to actuation of the drive motor 31, the prism 16 is driven at a rotational speed w.

A visual image of the rotating material 13 is transmitted by the microscope 20 on the optical axis 15 to the Dove prism 16. However, because of the common sense of rotation of the stage 12 and the prism 16 and the two-to-one rotational speed ratio therebetween, the prism 16 provides a stationary optical image output to the mirror 21. That output is reflected orthogonally by the reflective surface 22 to the video camera 25 and transmitted to the television monitor 29. Accordingly, an observer of the television monitor 29 is provided with a stationary, dynamic and upright representation of the material 13 being rotated and subjected to centrifugal forces by the stage 12.

Obviously, many modifications and variations of the present invention are possible in light of the above teachings. It is to be understood, therefore, that the invention can be practiced otherwise than as specifically described.

What is claimed is:

1. An optical system comprising:
   a stage for supporting a material to be observed and mounted for rotation on a given axis;
   a Dove prism mounted for rotation on said given axis and having an optical axis aligned therewith;
   a drive mechanism;
   a prism coupling mechanism coupled between said drive mechanism and said prism, said prism coupling mechanism being adapted to rotate said prism on said given axis; and
   a stage coupling mechanism coupled between said drive mechanism and said stage, said stage coupling mechanism being adapted to rotate said stage on said given axis and wherein said prism coupling mechanism and said stage coupling mechanism are arranged to provide a common direction of rotation for, respectively, said prism and said stage.

2. An optical system according to claim 1 including a microscope disposed between said stage and said prism and having an optical axis aligned with said given axis.

3. An optical system according to claim 2 including a mirror having a reflective face aligned with said given axis, said prism being disposed between said stage and said mirror.

4. An optical system according to claim 3 including a video camera arranged to receive optical images reflected from said mirror.

5. An optical system according to claim 4 including a television monitor connected to receive an output of said video camera.

6. An optical system comprising:
   a stage for supporting a material to be observed and mounted for rotation on a given axis;
   a Dove prism mounted for rotation on said given axis and having an optical axis aligned therewith;
   a drive mechanism;
   a prism coupling mechanism coupled between said drive mechanism and said prism, said prism coupling mechanism being adapted to rotate said prism on said given axis; and
   a stage coupling mechanism coupled between said drive mechanism and said stage, said stage coupling mechanism being adapted to rotate said stage on said given axis and wherein said prism coupling mechanism and said stage coupling mechanism are arranged to provide a common direction of rotation for, respectively, said prism and said stage; and said prism coupling mechanism provides for said prism a rotational speed w, and said stage coupling mechanism provides for said stage a rotational speed 2 w.

7. An optical system according to claim 6 including a microscope disposed between said stage and said prism and having an optical axis aligned with said given axis.

8. An optical system according to claim 7 including a mirror having a reflective face aligned with said given axis, said prism being disposed between said stage and said mirror.

9. An optical system according to claim 8 including a video camera arranged to receive optical images reflected from said mirror.

10. An optical system according to claim 9 including a television monitor connected to receive an output of said video camera.

11. An optical system according to claim 6 wherein said drive mechanism comprises a variable speed motor; said stage coupling mechanism comprises a first drive pulley rotated by said motor, a first driven pulley fixed for rotation with said stage and a first drive belt rotationally coupling said first drive pulley and said first driven pulley; and said prism coupling mechanism comprises a second drive pulley rotated by said motor, a second driven pulley fixed for rotation with said prism and a second drive belt rotationally coupling said second drive pulley and said second driven pulley.

12. An optical system according to claim 11 including a microscope disposed between said stage and said prism and having an optical axis aligned with said given axis.

13. An optical system according to claim 12 including a mirror having a reflective face aligned with said given axis, said prism being disposed between said stage and said mirror.

14. An optical system according to claim 13 including a video camera arranged to receive optical images reflected from said mirror.

15. An optical system according to claim 14 including a television monitor connected to receive an output of said video camera.

* * * * *